July 24, 1928.  D. F. HALIFAX  1,678,337
TOASTER
Filed April 21, 1927    2 Sheets-Sheet 1
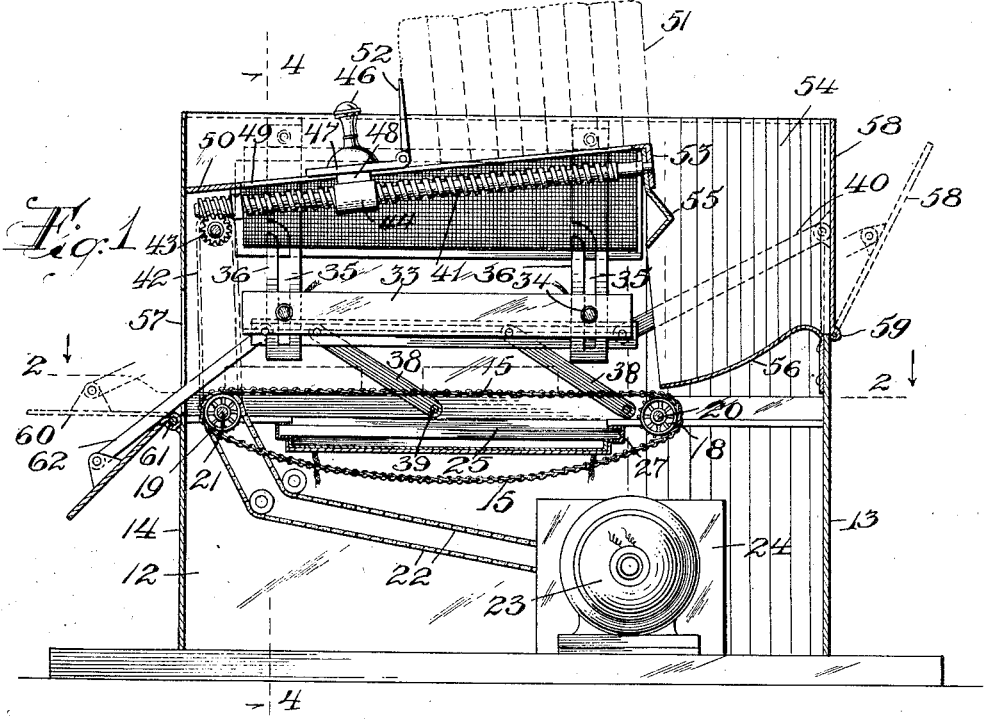
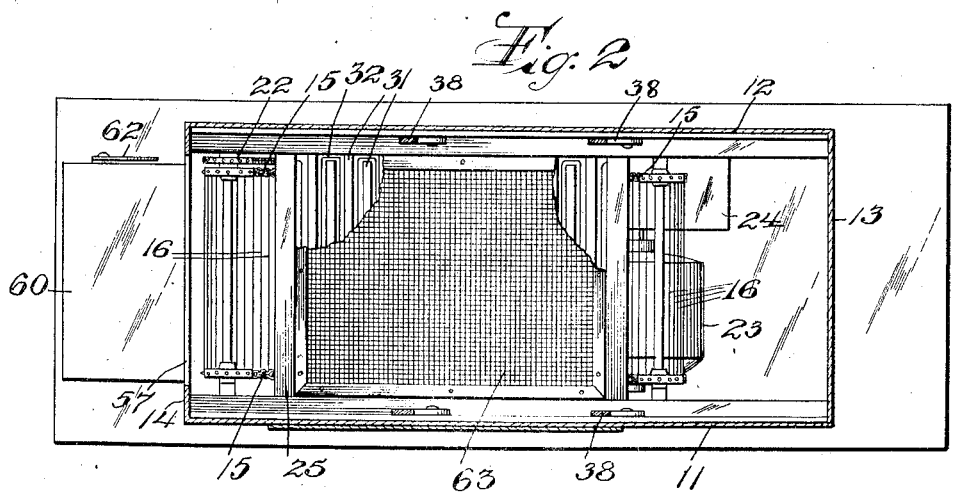
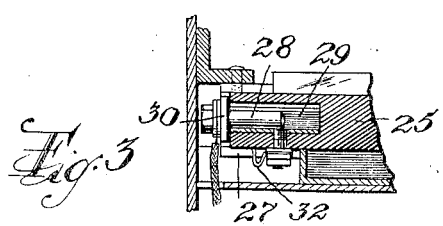
INVENTOR
Daniel F. Halifax
BY
Wm H Caufield
ATTORNEY July 24, 1928.
D. F. HALIFAX
TOASTER
Filed April 21, 1927
1,678,337
2 Sheets-Sheet 2
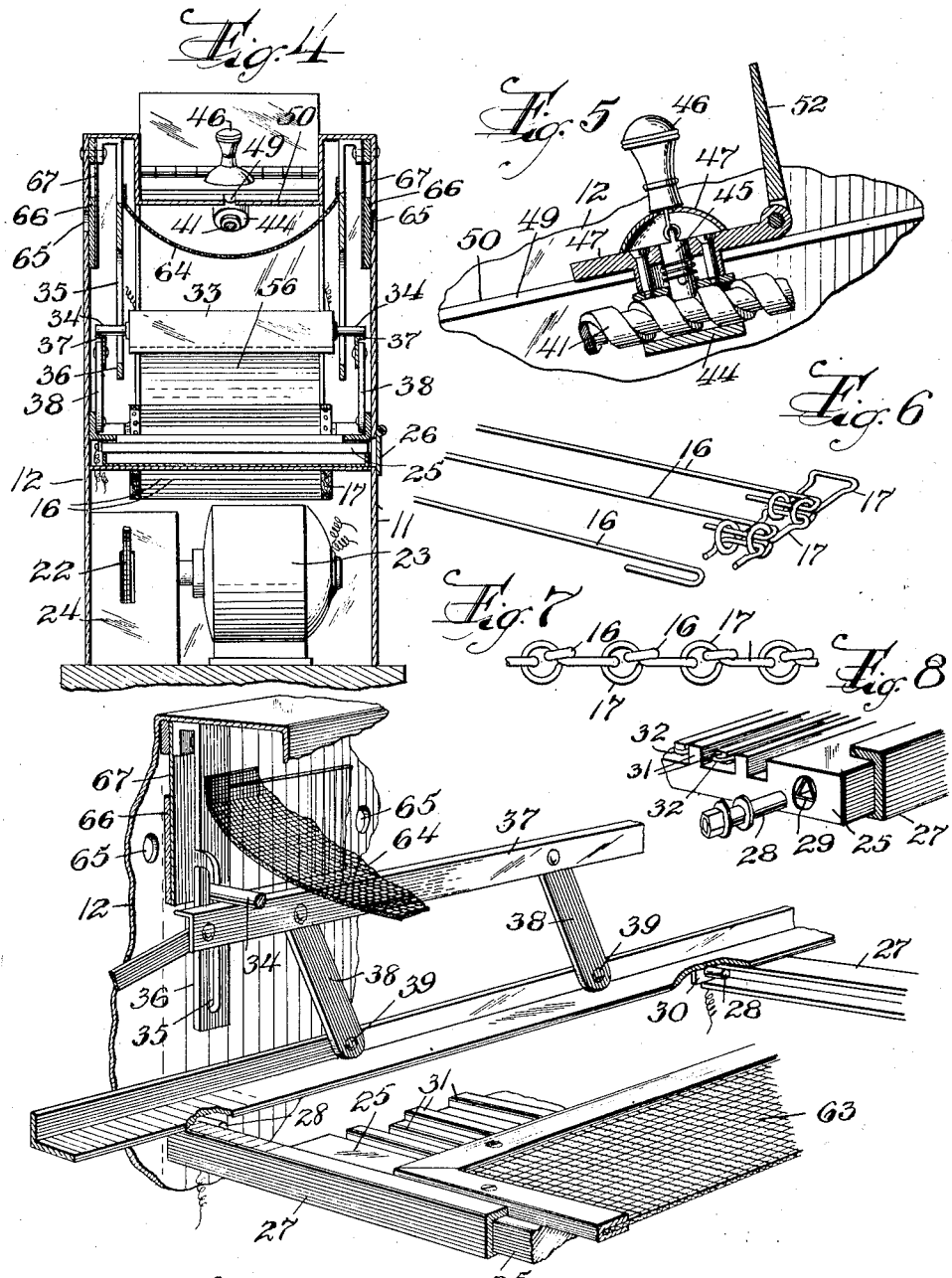
INVENTOR
Daniel F. Halifax
BY
Wm H Canfield
ATTORNEY Patented July 24, 1928.

1,678,337

UNITED STATES PATENT OFFICE.

DANIEL F. HALIFAX, OF NEWARK, NEW JERSEY.

TOASTER.

Application filed April 21, 1927. Serial No. 185,427.

This invention relates to an improved toaster, especially for bread and sandwiches which toaster is designed for use where toast is desired fresh and in a short time as at lunch counters. The invention provides a toaster in which there is a conveying means so that a slice of bread is deposited in one end and is passed along the faces of opposed heaters and is delivered as a slice of toast at the other end.

A feature of the invention is the adjustability of at least one of the heaters so that the heaters are spaced about equally from the top and bottom of a thin slice of bread or can be moved to be about equally spaced from the top and bottom faces of a sandwich which may be quite thick.

The invention is also directed to the production of a toaster in which a stack of slices or a loaf of bread sliced, is fed forward so that the slices, one at a time, are deposited so that the conveying means picks them up and passes them along to be toasted.

The invention also provides a toaster that does not overheat when placed in a counter casing as the casing is provided with ventilation openings which are opened when the heat inside the toaster becomes too high. This makes it unnecessary to shut off the electric current from time to time as the venting of the casing prevents excess heating of the interior.

The invention also includes certain details of construction which are more fully described hereinafter and are finally embodied in the claims.

The invention will be more fully understood by reference to the accompanying drawing in which Figure 1 is a longitudinal section of a toaster embodying my invention. Figure 2 is a section on line 2—2 in Figure 1. Figure 3 is a detail section of the connection of a heater. Figure 4 is a section on line 4—4 in Figure 1. Figure 5 is a detail of the feeding means and Figure 6 is a detail perspective of the conveyor. Figure 7 is an enlarged side view of the conveyor chain. Figure 8 is a perspective view of the connection shown in Figure 3 but with the parts separated. Figure 9 is a perspective view of the inside of the toaster with the parts broken away to more fully illustrate the various parts.

The preferred form of the toaster is that of a portable casing as its most common use is that of a counter machine and I show the device formed with a sheet metal casing having the sides 11 and 12 and with the front wall 13 and the rear wall 14.

In the use of the device where the toasting is done on order and where rapid delivery is desirable I have arranged a conveyor to pass the material to be toasted between heaters. The drawing shows a conveyor 15 in the form of a broad belt made of cross-wires 16 secured at their ends to the side chains 17 which pass over the pulleys 18 and 19, secured on cross-shafts 20 and 21 secured on the side walls of the casing. One of these shafts 21 is provided with a sprocket which is driven by a sprocket chain 22 from the motor 23 which transmits the power to the sprocket chain by any common form of speed reduction mechanism in the casing 24.

The lower heater 25 is arranged between the reaches of the conveyor and is readily removable because small particles falling through will lodge on the heater and it is easily withdrawn to clean it. The door 26 can be opened for this purpose. The heater 25 is mounted in tracks 27 and when it is slid into place it is electrically connected as I have provided posts 28 which are terminals of an electric circuit and the heater has its resistance wire connected to sockets 29 which fit over the posts. The terminals 28 are secured in the bent-over ends 30 of the tracks 27 and the sockets 29 are usually equilateral triangular sleeves of metal although other forms of slip connections can be employed. The heaters are shown as provided with ridges 31 projecting from opposite ends and the resistance wire 32 is passed back and forth around them and connected at the ends with the two socket terminals 29.

The upper heater 33 is of substantially the same construction except that its ready removal is not provided for as it is not in a position to require frequent cleaning. The heater 33 is adjustable and can be raised and lowered through suitable mechanism so that it is as far from the upper face of a slice of bread as is the lower heater from the bottom face so as to insure equal toasting on both sides and the heater is raised to provide the same relation of the two heaters to sandwiches which are in some cases rather thick.

The drawing shows a construction in which the heater 33 has two rods 34 projecting from each side and these slide in slots 35 in plates 36 to keep the heater in place horizontally. The heater descends by gravity but is supported and raised by the bars 37 on which the rods 34 rest. Links 38 are secured to the bar 37 so when the bars 37 on each side are moved longitudinally they also rise or fall according to the direction of horizontal movement. Means such as arms 40 extend to allow the easy manipulation of the bars 37.

To provide a steady supply of slices to the conveyor I arrange a feeding mechanism comprising a screw 41 rotated by suitable means such as a sprocket 42 and gearing 43. The nut 44 is provided with means for disconnecting it such as the spring-pressed tooth 45 which is raised when the handle 46 is tilted on the plate 47 which is arranged on the nut 44 and is connected thereto by a neck 48 which slides in a slot 49 in the top plate 50. The plate 50 is highly polished, usually plated, and supports a loaf of bread slices as shown at 51. The plate 52 is in rear of the loaf and as the nut advances the slices are successively pushed off the front end 53 of the top plate and fall into the well 54, and as the front end is directed forward by the plate 55 the slice then falls backward as the bottom of the slice hits the guide plate 56 and as the plate 56 is highly polished and smooth the slice is drawn by the conveyor on which the end of the slice falls. After the slice is toasted it passes out through the opening 57.

To provide for the toasting of sandwiches I permit their being placed by hand into the casing by hinging the flap 58 at 59 and connecting it to the arms 40 so that not only is a proper opening for inserting the sandwiches provided but the arms 40 pull up the links 38 to raise the upper heater to give the sandwich sufficient headroom. To prevent the sandwich from falling when ejected from the machine I provide a plate or tablet 60 which is raised to form a flat shelf when the upper heater is raised as shown in dotted outline in Figure 1. When the slices are being toasted and the upper heater is lowered the plate 60 acts as a chute for delivering the slices on a plate or pan, as the plate 60 is hinged at 61 and is connected by a side rod 62 to one of the bars 37.

I provide the heaters with a fine mesh screen 63 which I find gives a much more even toasting as it distributes the heat evenly over the entire surface of the heater so that the bread is toasted to an equal extent over its entire surface. The adjustable heater allows the heater 33 to be placed at the same distance from the bread as is the lower heater 25.

A screen 64 is placed to catch crumbs from the slot 49 and keeps the lower part clear of them.

The casing has openings 65 in the side walls and strips 66 of fibre or other material are placed so as to close them. The strips 66 are supported by thermostatic strips 67 so that when it gets too hot in the casing the strips 67 bend and carry the strip 66 back far enough to open the holes 65.

The conveyor is made of thin wires 16 which are somewhat widely separated and the interference with complete toasting is minimized.

Changes can be made in the shape and assembly of the parts without departing from the scope of my invention.

I claim:—

1. A toaster comprising a conveyor, means for operating the conveyor, a feeding means for slices, a connection for operating the feeding means, heating means flanking the supporting reach of the conveyor and means for adjusting the heating means for various thicknesses of slices.

2. A toaster comprising a conveyor, a feeding means for slices, means for operating the conveyor and the feeding means, a flap on the front of the toaster, a heater connected to the flap to be raised and lowered thereby, and a second heater opposed to the first heater.

3. A toaster comprising a conveyor, a heater for toasting an article on the conveyor, a flap on the toaster for regulating the size of the entrance and a connection from the flap to the heater whereby the moving of the flap moves the heater to regulate the size of the passage for the article.

4. A toaster comprising a casing having a conveyor therein, a heater between the reaches of the conveyor, said heater being removable transversely from the casing, a second heater above the conveyor, a track for the travel of said second heater, a bar for supporting said heater, links for raising and lowering the bar and an arm extending for manual operation and connected to the bar.

5. A toaster comprising a casing having a conveyor therein, a heater between the reaches of the conveyor, said heater being removable transversely from the casing, a second heater above the conveyor, a track for the travel of said second heater, a bar for supporting said heater, links for raising and lowering the bar and a delivery tray connected to the bar to be raised and lowered thereby.

6. A toaster comprising a casing having a conveyor therein, a heater between the reaches of the conveyor, said heater being removable transversely from the casing, a second heater above the conveyor, a track for the travel of said second heater, a bar for supporting said heater, links for raising and lowering the bar and a feeding means for supplying slices in succession to the conveyor and means for operating the feeding means when the conveyor is in operation.

7. A toaster comprising a casing, a conveyor in the casing, a heater between the reaches of the conveyor, a transverse track for the heater, a pair of terminals on the ends of the track, and socket terminals on the heater for receiving the terminals when the heater is pressed into position.

In testimony whereof I affix my signature.

DANIEL F. HALIFAX.